United States Patent
Gafni et al.

(10) Patent No.: US 10,237,204 B2
(45) Date of Patent: Mar. 19, 2019

(54) SWITCH CHASSIS WITH FLEXIBLE TOPOLOGY

(71) Applicant: Mellanox Technologies TLV Ltd., Raanana (IL)

(72) Inventors: Barak Gafni, Kfar Malal (IL); Eitan Zahavi, Zichron Yaakov (IL); Benny Koren, Zichron Yaakov (IL)

(73) Assignee: Mellanox Technologies TLV Ltd., Raanana (IL)

( * ) Notice: Subject to any disclaimer, the term of this patent is extended or adjusted under 35 U.S.C. 154(b) by 86 days.

(21) Appl. No.: 14/975,788

(22) Filed: Dec. 20, 2015

(65) Prior Publication Data
US 2017/0181315 A1    Jun. 22, 2017

(51) Int. Cl.
*H04L 12/24* (2006.01)
*H04L 12/933* (2013.01)

(52) U.S. Cl.
CPC .................. *H04L 49/15* (2013.01)

(58) Field of Classification Search
CPC ......... H05K 5/0026; H05K 7/18; H04L 49/15
USPC .................................. 340/2.2, 14.2
See application file for complete search history.

(56) References Cited

U.S. PATENT DOCUMENTS

| | | | | |
|---|---|---|---|---|
| 5,233,501 A * | 8/1993 | Allen | ............... | H01R 13/518 200/51.04 |
| 5,937,130 A * | 8/1999 | Amberg | ............... | G02B 6/3807 385/134 |
| 7,170,895 B2 * | 1/2007 | Wirth | ............... | H04L 12/42 370/217 |
| 8,107,256 B1 * | 1/2012 | Kondrat | ............... | G06F 1/186 361/788 |
| 8,570,865 B2 | 10/2013 | Goldenberg et al. | | |
| 2010/0303086 A1 * | 12/2010 | Bialkowski | ............. | H04L 49/45 370/401 |
| 2011/0302346 A1 * | 12/2011 | Vahdat | ............... | H04L 49/40 710/301 |
| 2012/0250574 A1 * | 10/2012 | Marr | ............... | H04L 41/12 370/254 |
| 2012/0293934 A1 * | 11/2012 | Boduch | ............... | G06F 1/186 361/679.02 |

(Continued)

OTHER PUBLICATIONS

Leiserson ., "Fat-Trees: Universal Networks for Hardware Efficient Supercomputing," IEEE Transactions on Computers, vol. C-3. No. 10, pp. 892-901, Oct. 1985.

*Primary Examiner* — Vernal U Brown
(74) *Attorney, Agent, or Firm* — Kligler & Associates

(57) ABSTRACT

A method for communication includes providing multiple chassis. Each chassis includes a plurality of slots, which are arranged in at least an outer tier and a middle tier, and which are configured for insertion therein of respective switches. In at least a first chassis among the multiple chassis, first internal interconnects are connected between the slots in the middle tier and the slots in the outer tier, so as to connect each of the slots in the middle tier to multiple slots in the outer tier. In at least a second chassis among the multiple chassis, second internal interconnects are connected directly between the slots in the outer tier. External interconnects are connected between at least some of the slots in the outer tier of the first chassis and at least some of the slots in the outer tier of the second chassis in order to define a network.

21 Claims, 2 Drawing Sheets

(56) References Cited

U.S. PATENT DOCUMENTS

2013/0010639 A1* 1/2013 Armstrong .............. H04L 41/24
370/254

* cited by examiner

SWITCH CHASSIS WITH FLEXIBLE TOPOLOGY

FIELD OF THE INVENTION

The present invention relates generally to data communication networks, and particularly to apparatus and methods for switching in such networks.

BACKGROUND

Various types of switching networks are known in the art. Some of these types have hierarchical topologies, meaning that the switches in the network are connected together in multiple stages (or levels). A signal input at one of the edge ports of the switching network, at the bottom of the hierarchy, generally pass through one or more internal stages, at higher levels in the hierarchy, before reaching another edge port from which it is output. Some hierarchical networks are non-blocking, in the sense that any unused edge port can always be connected to any other unused edge port, regardless of existing connections within the network.

A fat-tree network is a kind of hierarchical switching network, also referred to as a CBB or Clos network, which is made up of crossbar switches arranged in interconnected stages. Fat-tree networks were originally defined by Leiserson in "Fat-Trees: Universal Networks for Hardware Efficient Supercomputing," IEEE Transactions on Computers C-34(10), pages 892-901 (1985), and are now widely used in parallel and distributed computing architectures. Further aspects of fat trees are described, for example, in U.S. Pat. No. 8,570,865, whose disclosure is incorporated herein by reference.

In a fat-tree network, computing nodes are connected to leaf switches at the edge of the network, and the leaf switches are interconnected by links to spine switches arranged in multiple hierarchical levels inside the network. The numbers of spine switches and links at each level are chosen so as to provide sufficient bandwidth between the spine switches to enable multiple computing nodes (or all of the computing nodes) to exchange messages via the network concurrently. The term "fat-tree" is used broadly in the art to define any and all types of communication networks meeting the above criteria and includes extended and generalized types of fat trees.

SUMMARY

Embodiments of the present invention that are described hereinbelow provide apparatus and methods for assembly of switching networks with enhanced flexibility.

There is therefore provided, in accordance with an embodiment of the invention, switching apparatus, which includes a chassis, including a plurality of slots, which are arranged in at least three tiers, including first and second outer tiers and a middle tier, and which are configured for insertion therein of respective switches, each switch having multiple ports. First and second internal interconnects extend between the slots in the middle tier and the slots in the first and second outer tiers, respectively, so as to connect each of the slots in the middle tier to multiple slots in each of the first and second outer tiers. External interconnects extend from the slots in the outer tiers for connection to components outside the apparatus. Jumper modules are configured for insertion in the slots in the middle tier in place of the respective switches. Each jumper module includes multiple jumpers for connecting the first internal interconnects directly to respective ones of the second internal interconnects.

In some embodiments, each slot has multiple terminals, which connect to the ports of a switch when the switch is inserted into the slot, and the interconnects include conductors extending between the terminals of the slots. Typically, each of the jumpers in the jumper modules is configured to create a short-circuit between a pair of the terminals when the jumper modules are inserted into the slots in the middle tier. In a disclosed embodiment, the chassis includes a backplane, the switches are configured as circuit boards, and the slots include receptacles that are configured to receive the circuit boards. Alternatively, the chassis includes a circuit board, and the switches are contained in integrated circuit packages, and the slots include sockets that are configured to receive the integrated circuit packages.

In a disclosed embodiment, the first and second internal interconnects connect each of the slots in the middle tier to all of the slots in each of the first and second outer tiers, so that when a switch is inserted into any given slot in the middle tier, each of the slots in each of the outer tiers is connected to a respective one of the ports of the switch. Typically, the jumper modules are configured so that when a jumper module is inserted into the given slot in the middle tier, each of the slots in the first outer tier is connected by at least one of the jumpers in the jumper module to a respective one of the slots in the second outer tier.

There is also provided, in accordance with an embodiment of the invention, a switching network, including a first switching apparatus, as described above, in which all of the slots are populated with the switches. In multiple second switching apparatuses of the sort described above, the slots in the middle tier are populated with the jumper modules, and the external interconnects of the slots in the first outer tier are connected to respective ones of the external interconnects of the slots in the outer tiers of the first switching apparatus.

In one embodiment, the first and second switching apparatuses are configured and interconnected so as to define a fat tree.

Additionally or alternatively, the external interconnects of the slots in the second outer tier of the second switching apparatuses are coupled to other components of the network, selected from a set of components consisting of other switching apparatuses and computing nodes.

There is additionally provided, in accordance with an embodiment of the invention, a method for communication, which includes providing multiple chassis. Each chassis including a plurality of slots, which are arranged in at least three tiers, including first and second outer tiers and a middle tier, and which are configured for insertion therein of respective switches, each switch having multiple ports. First and second internal interconnects extend between the slots in the middle tier and the slots in the first and second outer tiers, respectively, so as to connect each of the slots in the middle tier to multiple slots in each of the first and second outer tiers. External interconnects extend from the slots in the outer tiers for connection to components outside the chassis. Jumper modules are inserted in the slots in the middle tier in place of the respective switches in one or more of the chassis. Each jumper module includes multiple jumpers for connecting the first internal interconnects directly to respective ones of the second internal interconnects. At least some of the external interconnects of the multiple chassis are coupled together in order to define a network.

There is further provided, in accordance with an embodiment of the invention, a method for communication, which includes providing multiple chassis, each chassis including a plurality of slots, which are arranged in at least an outer tier and a middle tier, and which are configured for insertion therein of respective switches, each switch having multiple ports. In at least a first chassis among the multiple chassis, first internal interconnects are connected between the slots in the middle tier and the slots in the outer tier, so as to connect each of the slots in the middle tier to multiple slots in the outer tier. In at least a second chassis among the multiple chassis, second internal interconnects are connected directly between the slots in the outer tier. External interconnects are connected between at least some of the slots in the outer tier of the first chassis and at least some of the slots in the outer tier of the second chassis in order to define a network.

In one embodiment, connecting the second internal interconnects includes inserting jumper modules in the slots in the middle tier of the second chassis in place of the respective switches. In another embodiment, the internal and external interconnects include cables.

The present invention will be more fully understood from the following detailed description of the embodiments thereof, taken together with the drawings in which:

DETAILED DESCRIPTION OF EMBODIMENTS

Figure 1:
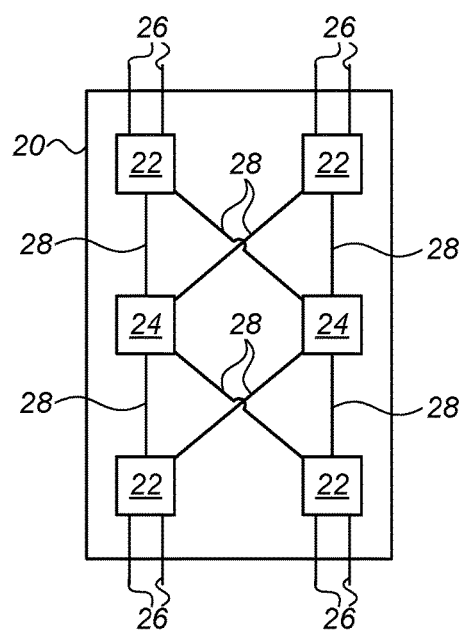
FIG. 1 is block diagram that schematically illustrates a switch chassis, in accordance with an embodiment of the invention.

In many large-scale, high-speed computing networks, such as data center networks, the computing nodes (servers) are interconnected by a fat-tree network containing a large number of switches, in a hierarchy of multiple tiers. It is not practical to mount all of these switches in a single chassis. Therefore, the network is typically built up from multiple chassis, each containing one or more switches, either as a stand-alone switches or as part of chassis, which may or may not be managed as a single switch. The chassis themselves are also arranged hierarchically, with one or more chassis holding as the highest-level spines, and other chassis containing middle-level spines and leaf switches. The internal building blocks and topologies of the chassis may vary depending upon their location in the hierarchy. Therefore, vendors of switching components typically supply two or more different types of chassis, which the system integrator must select, stock, and connect properly in order to achieve the desired network configuration. This approach may lead to inefficient use of building blocks and topologies in order to support a variety of use cases with a single or limited number of designs.

Embodiments of the present invention that are described herein provide chassis with a flexible internal topology, so that the same chassis can be used for multiple functions and deployed at multiple positions within a hierarchical switching network. Specifically, as described in detail hereinbelow, these chassis can configured, for example by means of internal jumpers, to serve at all levels of a fat-tree network with high efficiency. The consequent reduction in the number of different chassis types and ancillary components that the vendor must supply and the system integrator must maintain leads to a reduction in the capital costs and operating costs of the network.

The disclosed embodiments provide chassis for switching apparatus, having multiple slots into which switches can be inserted. The term "switch" refers to any electronic component having multiple external ports and internal logic for selectably interconnecting the ports. Thus, a switch, in the context of the present description and in the claims, may range from a simple crossbar switch to a variety of multiport devices with forwarding, routing, and/or admission control capabilities, such as a bridge, router or suitable network processor.

The term "chassis" is used broadly, in the context of the present description and in the claims, to refer to any sort of plug-in framework for switch components, wherein the slots of the chassis have terminals that connect to the ports of the switch that is inserted into the slot. For example, when using switches configured as circuit boards, the chassis typically comprises a backplane, with receptacles for the circuit boards. Alternatively, for switches contained in integrated circuit (IC) packages, the slots comprise appropriate sockets for the IC packages, while the chassis may comprise a printed circuit board on which the sockets are mounted. Alternatively, the principles of the present invention may be implemented using chassis of other sorts.

In the disclosed embodiments, the slots in each chassis are arranged in at least three tiers, including two outer tiers and a middle tier between them. Each of the slots in the middle tier is connected to multiple slots in the outer tiers (or, in some embodiments, to all of the slots in the outer tiers) by respective internal interconnects. In addition, external interconnects extend from the slots in the outer tiers for connection to other components outside the chassis, such as other switching apparatuses or computing nodes, for example. The two outer tiers are topologically identical, in the sense that all the slots in these tiers have both internal interconnects to the middle tier and external interconnects. It is therefore also possible to regard the two outer tiers in the present description simply as different partitions of a single outer tier; and the functionality and connectivity of the chassis provided by embodiments of the present invention do not require that the two outer tiers be physically separated, for example by positioning them on opposite sides of the middle tier. Rather, the tiers are defined and differentiated on the basis of their connectivity within and outside the chassis.

The chassis in the switching apparatus has (at least) two configurations, which depend upon whether switches or jumper modules are inserted in the slots in the middle tier. Each jumper module comprises multiple jumpers, which create short-circuits between pairs of the terminals in the slot in which it is inserted, thus connecting the slots in the outer tiers directly to one another via the internal interconnects of the chassis. (The term "directly connected," in the context of the present description and in the claims, means that the terminals in question are connected to one another without an intervening switch.) When the middle tier of the chassis is populated with switches, the apparatus is suitable for deployment at the highest level of a fat-tree network, for example. On the other hand, with jumper modules in the middle tier, the chassis is suitable for use in a middle or leaf level of the network. Because the chassis contains a smaller number of switches in this latter configuration, the power consumption and cost of the apparatus are reduced. At the same time, the entire network can be built up, as explained above, using multiple chassis of the same type.

Although the disclosed embodiments relate to certain particular network types and topologies, the principles of the present invention are similarly applicable to other sorts of large-scale switching networks, as will be apparent to those skilled in the art. Furthermore, these principles may be implemented not only in conventional chassis technologies (such as hard-wired backplanes and printed circuit boards), but also using flexibly-configured backplanes, with connections made by cables and/or switches integrated within the backplane. For example, in a cable-based backplane, the two (or more) different configurations of the chassis can be produced by connecting cables as internal interconnects between the slots in the middle tier and the slots in the outer tier in one chassis configuration, while connecting cables directly between different slots in the outer tier in another chassis configuration. Although jumper modules offer a particularly simple, reliable and convenient means for modifying the internal connectivity of the backplane, such modules are not required in all embodiments.

FIG. 1 is block diagram that schematically illustrates a switch chassis 20, in accordance with an embodiment of the invention. As noted earlier, chassis 20 typically comprises a backplane or other printed circuit board containing slots 22 and 24 in the form, for example, of suitable edge connector receptacles or IC sockets, as are known in the art. Each slot is configured for insertion of a switch therein, as shown in the figures that follow, and contains terminals (not shown) that connect to the ports of the switch when the switch is inserted into the socket.

Figure 5:
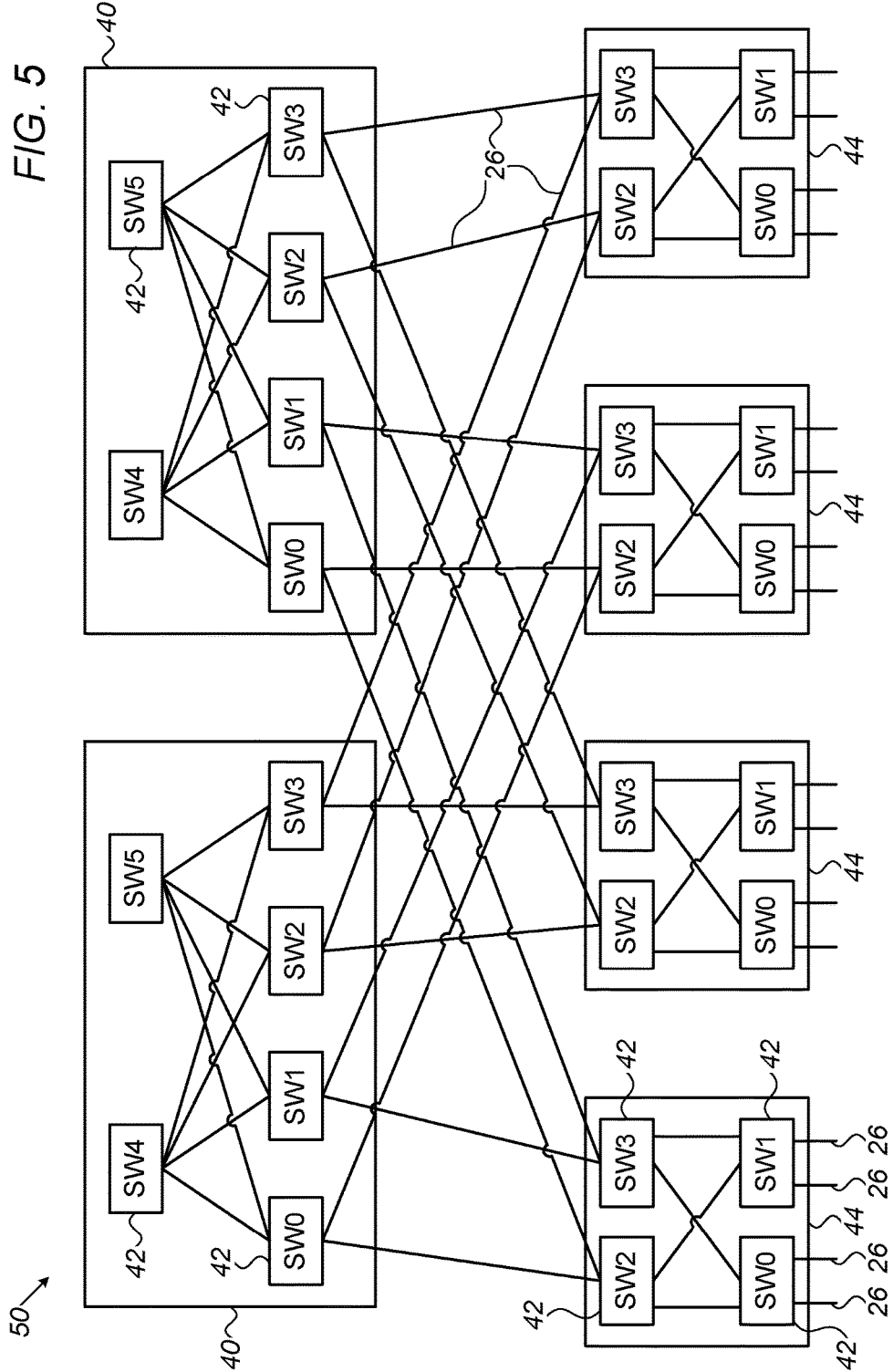
FIG. 5 is a block diagram that schematically shows a fat-tree network assembled from the switch chassis of FIGS. 4 and 5, in accordance with an embodiment of the invention.

The slots in chassis 20 are arranged in three tiers: slots 22 in opposing outer tiers and slots 24 in a middle tier between the outer tiers. (As noted above, the two outer tiers shown in FIG. 1 can be viewed as partitions of a single tier, as illustrated particularly by the configuration of apparatuses 40 that is illustrated in FIG. 5 and described below.) Internally, slots 22 and 24 can be identical, so that the same switch can be inserted into any of them. The slots differ in that external interconnects 26 extend from slots 22 in the outer tiers for connection to components outside chassis 20. Internal interconnects 28 connect each of slots 24 in the middle tier to slots 22 in the outer tiers. Typically (although not necessarily), internal interconnects 28 connect each of slots 24 in the middle tier to all of slots 22 in each of the two outer tiers. Thus, when a switch is inserted into any given slot 24 in the middle tier, each of slots 22 in each of the outer tiers is connected to a respective port of the switch. As a result, the topology of chassis is non-blocking, and any of the switches in a given outer tier can communicate with all of the switches in the other outer tier through each of the switches in the middle tier.

For the sake of simplicity, chassis 20 is shown in the figures as containing only two sockets 22, 24 in each tier, with four interconnects per socket, corresponding to four ports per switch. In practice, chassis 20 typically contains a larger number of sockets in each tier, for example, four, eight, or even more sockets, supporting eight or more ports per switch. Furthermore, the principles of the present invention may readily be extended to chassis containing four or more tiers of sockets, containing two or more middle tiers, rather than a single middle tier as in the pictured embodiments, as well as chassis with sockets having different numbers of interconnects.

Figure 2A:
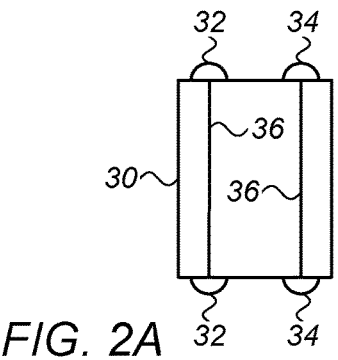
FIGS. 2A and 2B are block diagrams that schematically illustrate jumper modules, in accordance with an embodiment of the invention.
Figure 2B:
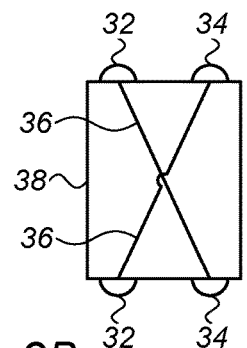

FIGS. 2A and 2B are block diagrams that schematically illustrate jumper modules 30 and 38, respectively, in accordance with an embodiment of the invention. These jumper modules are configured for insertion in slots 24 in the middle tier of chassis 20, in place of the switches. The jumper modules have terminals 32, 34 in place of the switch ports for connection, via the slot terminals, to internal interconnects 28. Jumper modules 30 and 38 are made to be physically and electrically compatible with the corresponding switches, so that they can conveniently be plugged into and out of slots 24 in order to change the configuration (i.e., the internal topology) of the chassis. Thus, for example, modules 30 and 38 may comprise substrates such as printed circuit boards with edge connectors identical to those of the switch boards, or interposers configured to plug into the same sockets as the IC packages containing the switches. Alternatively, the functionality of these jumper modules may be implemented using any suitable sort of interconnects that are known in the art.

Figure 4:
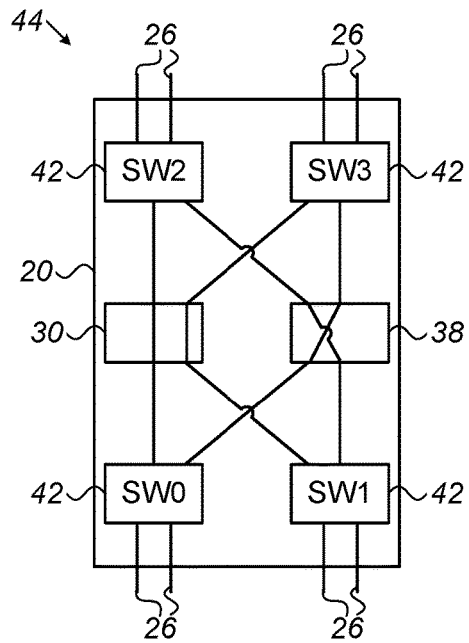
FIG. 4 is a block diagram that schematically illustrates a switch chassis in a partly-populated configuration, in accordance with an embodiment of the invention.

Each jumper module comprises multiple jumpers 36 extending between terminals 32 and 34, for connecting the internal interconnects 28 that link the given socket 24 to sockets 22 in one of the outer tiers to the internal interconnects 28 that link this socket 24 to sockets 22 in the other outer tier. Jumpers 36 typically comprise either wires or printed conductors, which create short-circuits between the terminals of slot 24 to which terminals 32 and 34 are connected. In module 30, jumpers 36 connect terminal 32 on one side of the module to terminal 32 on the other, and similarly connect terminals 34 one to the other. In module 38, on the other hand, jumpers 36 cross-connect the terminals. (The reason for using these different module configurations is illustrated in FIG. 4.) Although only two types of jumper modules are shown in the present simplified example, chassis with larger numbers of slots may require a larger number of different jumper modules. In any case, the jumper modules remain simple, inexpensive components.

Figure 3:
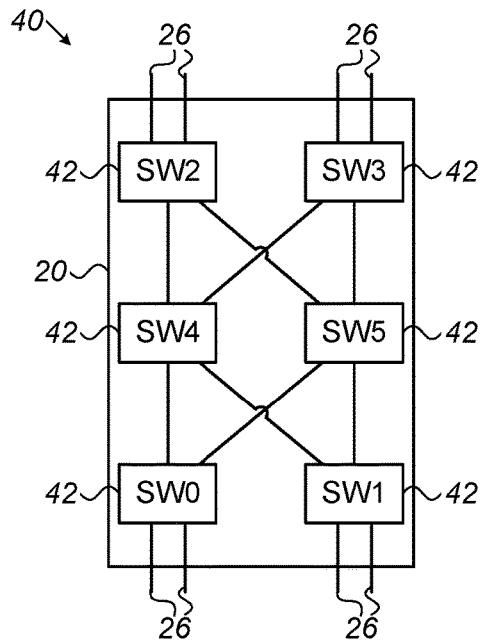
FIG. 3 is a block diagram that schematically illustrates a switch chassis in a fully-populated configuration, in accordance with an embodiment of the invention.

FIG. 3 is a block diagram that schematically illustrates switching apparatus 40, comprising switch chassis 20 in a fully-populated configuration, in accordance with an embodiment of the invention. Switches 42 are plugged into all of the slots of the chassis, with switches labeled SW0, SW1, SW2 and SW3 in the outer tiers and switches SW4 and SW5 in the middle tier. Each of the switches in the outer tiers is connected to a respective port on SW4 and a respective port on SW5.

FIG. 4 is a block diagram that schematically illustrates switching apparatus 44, comprising switch chassis 20 in a partly-populated configuration, in accordance with another embodiment of the invention. In this case, switches SW4 and SW5 in the middle tier are replaced by jumper modules 30 and 38, respectively. When the jumper modules are inserted into the slots in the middle tier in this manner, each of the slots in each outer tier is connected by one of jumpers 36 in each jumper module 30, to a respective slot in the other outer tier. Alternatively, when sockets 24 have a larger number of internal interconnects 28, each of the slots in each of the outer tiers may be connected by two or more jumpers to the respective slot in the other outer tier.

Specifically, in the present example, each port of switches 42 in each of the outer tiers is connected via jumper module 30 or 38 to a corresponding port of a switch in the other outer tier, and vice versa. In other words, apparatus 44 operates as a two-tier switch chassis, with each switch in each tier connected to all of the switches in the other tier. This same sort of connectivity could be achieved in apparatus 40 (FIG. 3), by static configuration of switches 42 in the middle tier (SW4 and SW5) to give the connectivity of jumper modules 30 and 38. This alternative, however, suffers from the drawbacks of higher power consumption and the wasted extra cost of two unneeded switches in the middle tier.

FIG. 5 is a block diagram that schematically shows a fat-tree network 50 assembled from apparatuses 40 and 44 (as shown in FIGS. 4 and 5), in accordance with an embodiment of the invention. Two apparatuses 40, in which all slots of the chassis are populated with switches 42, serve as the highest-level spine, with switches SW4 and SW5 at the top of the hierarchy. Multiple apparatuses 44 (with the jumper modules in the slots in the middle tier omitted from this figure for the sake of simplicity) serve as middle-level spines or leaves. Each external interconnect 26 of switches SW2 and SW3, in the upper outer tier of each of apparatuses 44, is connected to a respective external interconnect of one of switches SW0, SW1, SW2 and SW3 in the outer tiers of apparatus 40. External interconnects of switches SW0 and SW1, in the lower outer tier of apparatuses 44, are connected either to switches in other, similar apparatuses 44 in the next level down of network 50 or to computing nodes (not shown).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Switching apparatus, comprising:
a chassis, comprising a plurality of slots, which are arranged in at least three tiers, comprising first and second outer tiers and a middle tier, and which are configured for insertion therein of respective switches, each switch having multiple ports;
first and second internal interconnects extending between the slots in the middle tier and the slots in the first and second outer tiers, respectively, so as to connect each of the slots in the middle tier to multiple slots in each of the first and second outer tiers;
external interconnects extending from the slots in the outer tiers for connection to components outside the apparatus; and
jumper modules configured for insertion in the slots in the middle tier in place of the respective switches, each jumper module comprising multiple jumpers for connecting the first internal interconnects directly to respective ones of the second internal interconnects.

2. The apparatus according to claim 1,
wherein each slot has multiple terminals, which connect to the ports of a switch when the switch is inserted into the slot,
wherein the interconnects comprise conductors extending between the terminals of the slots,
wherein each one of the jumper modules comprises a plurality of jumper-module terminals configured to connect to the terminals of the slots in the middle tier in place of the ports of the switches, and
wherein the jumpers connect those of the jumper-module terminals that are on one side of the jumper module to those of the jumper-module terminals that are on another side of the jumper module.

3. The apparatus according to claim 2, wherein each of the jumpers in the jumper modules is configured to create a short-circuit between a pair of the terminals when the jumper modules are inserted into the slots in the middle tier.

4. The apparatus according to claim 2, wherein the chassis comprises a backplane, the switches are configured as circuit boards, the slots comprise receptacles that are configured to receive the circuit boards, the jumper modules comprise printed circuit boards configured to plug into the receptacles in place of the switches, and the jumpers comprise conductors printed onto the printed circuit boards.

5. The apparatus according to claim 4, wherein the printed circuit boards comprise edge connectors identical to edge connectors of the switches.

6. The apparatus according to claim 2, wherein the chassis comprises a circuit board, the switches are contained in integrated circuit packages, the slots comprise sockets that are configured to receive the integrated circuit packages, and the jumper modules comprise interposers configured to plug into the sockets in place of the integrated circuit packages.

7. The apparatus according to claim 6, wherein the jumper modules are configured so that when a jumper module is inserted into the given slot in the middle tier, each of the slots in the first outer tier is connected by at least one of the jumpers in the jumper module to a respective one of the slots in the second outer tier.

8. The apparatus according to claim 1, wherein the first and second internal interconnects connect each of the slots in the middle tier to all of the slots in each of the first and second outer tiers, so that when a switch is inserted into any given slot in the middle tier, each of the slots in each of the outer tiers is connected to a respective one of the ports of the switch.

9. A switching network, comprising:
multiple chassis of a same type, including at least a first chassis and a plurality of second chassis, each of the chassis comprising a plurality of slots, which are arranged in at least three tiers, comprising first and second outer tiers and a middle tier, and having external interconnects extending from the slots in the outer tiers and first and second internal interconnects extending between the slots in the middle tier and the slots in the first and second outer tiers, respectively, so as to connect each of the slots in the middle tier to multiple slots in each of the first and second outer tiers;
first switches inserted into all of the slots in the first chassis;
second switches inserted into the slots in the outer tiers of each of the plurality of second chassis; and
jumper modules inserted into the slots in the middle tier of each of the plurality of second chassis, each jumper module comprising multiple jumpers for connecting the first internal interconnects directly to respective ones of the second internal interconnects,
wherein the external interconnects of the slots in the first outer tier of each of the second chassis are connected to respective ones of the external interconnects of the slots in the outer tiers of the first chassis.

10. The network according to claim 9, wherein the first and second chassis are configured and interconnected so as to define a fat tree.

11. The network according to claim 9, wherein the external interconnects of the slots in the second outer tier of the second chassis are coupled to other components of the network, selected from a set of components consisting of other switching apparatuses and computing nodes.

12. A method for communication, comprising:

providing multiple chassis, each chassis comprising a plurality of slots, which are arranged in at least three tiers, comprising first and second outer tiers and a middle tier, and which are configured for insertion therein of respective switches, each switch having multiple ports, with first and second internal interconnects extending between the slots in the middle tier and the slots in the first and second outer tiers, respectively, so as to connect each of the slots in the middle tier to multiple slots in each of the first and second outer tiers, and external interconnects extending from the slots in the outer tiers for connection to components outside the chassis;

inserting jumper modules in the slots in the middle tier in place of the respective switches in one or more of the chassis, each jumper module comprising multiple jumpers for connecting the first internal interconnects directly to respective ones of the second internal interconnects; and coupling together at least some of the external interconnects of the multiple chassis in order to define a network.

13. The method according to claim 12, wherein each slot has multiple terminals, which connect to the ports of a switch when the switch is inserted into the slot, and wherein the interconnects comprise conductors extending between the terminals of the slots.

14. The method according to claim 13, wherein inserting the jumper modules comprises creating, with each of jumpers, a short-circuit between a pair of the terminals when the jumper modules are inserted into the slots in the middle tier.

15. The method according to claim 13, wherein the chassis comprises a backplane, the switches are configured as circuit boards, and the slots comprise receptacles that are configured to receive the circuit boards.

16. The method according to claim 13, wherein the chassis comprises a circuit board, and the switches are contained in integrated circuit packages, and the slots comprise sockets that are configured to receive the integrated circuit packages.

17. The method according to claim 12, wherein the first and second internal interconnects connect each of the slots in the middle tier to all of the slots in each of the first and second outer tiers, so that when a switch is inserted into any given slot in the middle tier, each of the slots in each of the outer tiers is connected to a respective one of the ports of the switch.

18. The method according to claim 17, wherein inserting the jumper modules comprises, when a jumper module is inserted into the given slot in the middle tier, connecting each of the slots in the first outer tier by at least one of the jumpers in the jumper module to a respective one of the slots in the second outer tier.

19. The method according to claim 12, wherein coupling together the at least some of the external interconnects comprises coupling a first chassis, in which all of the slots are populated with the switches, to multiple second chassis, in which the slots in the middle tier are populated with the jumper modules, such that the external interconnects of the slots in the first outer tier of the multiple second chassis are connected to respective ones of the external interconnects of the slots in the outer tiers of the first chassis.

20. The method according to claim 19, wherein coupling the first chassis to the multiple second chassis comprises interconnecting the chassis so as to define a fat tree.

21. The method according to claim 19, and comprising coupling the external interconnects of the slots in the second outer tier of the second switching chassis to other components of the network, selected from a set of components consisting of other switching chassis and computing nodes.

* * * * *